United States Patent [19]

Evans

[11] 4,168,488
[45] Sep. 18, 1979

[54] IMAGE ROTATION APPARATUS

[75] Inventor: Peter J. Evans, Romsey, England

[73] Assignee: International Business Machines Corporation, Armonk, N.Y.

[21] Appl. No.: 931,659

[22] Filed: Aug. 30, 1978

[30] Foreign Application Priority Data

Sep. 12, 1977 [GB] United Kingdom ............... 51440/77

[51] Int. Cl.² ............................................ G06K 9/12
[52] U.S. Cl. ................. 340/146.3 H; 340/146.3 MA; 364/521
[58] Field of Search ............ 340/146.3 H, 146.3 MA, 340/146.3 R, 146.3 AH; 364/515, 521, 518

[56] References Cited

U.S. PATENT DOCUMENTS

| 3,760,357 | 9/1973 | Inose et al. | 340/146.3 H |
| 3,811,110 | 5/1974 | Inose et al. | 340/146.3 H |
| 3,849,760 | 11/1974 | Endou et al. | 340/146.3 H |
| 4,052,699 | 10/1977 | Micka et al. | 340/146.3 MA |

OTHER PUBLICATIONS

Gold et al., "Shift Register System For Image Orientation", *IBM Tech. Disclosure Bulletin*, vol. 18, No. 8, Jan. 1976, pp. 2633-2639.
Morrin, "Rotation of Images Using Contour Compressed Data" IBM Tech. Disclosure Bulletin, vol. 18, No. 8, Jan. 1976, pp. 2640-2642.
Casey et al., "Parallel Linear Transformations on 2-D Binary Images" *IBM Tech. Disclosure Bulletin*, vol. 13, No. 11, Apr. 1971, pp. 3267-3268.

*Primary Examiner*—Leo H. Boudreau
*Attorney, Agent, or Firm*—James E. Murray

[57] ABSTRACT

This specification describes image rotation hardware for allowing the displaying of an image stored in digital form in other than its originally stored orientation. In this hardware a word-organized image buffer stores a digital representation of a full image with each picture element (pel) of the full image being represented by a bit within the buffer. The buffer is divided into a plurality of square sections each storing a portion or subimage of the full image. Each section is n×n bits in size where n is the number of bits in a word stored in the buffer. The contents of each square section of the buffer can be transferred into an n×n storage array with first word organization, and then transferred back into the buffer with second word organization such that the subimage stored by the square section is rotated through 90°.

7 Claims, 12 Drawing Figures

IMAGE ROTATION APPARATUS

BACKGROUND

This invention relates to an image rotation apparatus which may be used in display apparatus for displaying an image stored in digital form.

Such a display apparatus can be used to provide an operator with information contained on a document previously scanned into data processing equipment to which the apparatus is connected. Normally the information is contained on the document in vertical format but occasionally a document, such as a graph or diagram, is intended to be viewed horizontally. One solution to this problem would be to scan a "horizontal" document so that it is stored electronically in the correct orientation. Most scanners are only able to receive documents in one orientation. Furthermore some documents may have the information on them oriented both vertically and horizontally.

It would be possible to provide a display apparatus in which the viewing screen could be rotated so that whatever the orientation of a document when first presented on the screen, the screen could be rotated to bring the displayed image into the correct orientation for viewing. However such an arrangement would cause the display apparatus to be unnecessarily bulky and would also introduce the possibility of unreliability due to the mechanical movements involved.

Generally, therefore, what is required is some means of rotating the image, or parts of it, electronically. Such an operation could be performed by software in the data processing equipment but this would require an unreasonable length of time and would also use "expensive" processor time.

THE INVENTION

In accordance with the present invention, electronic rotation of the stored image is performed by hardware. In this hardware a word-organized image buffer stores a digital representation of a full image with each picture element (pel) of the full image being represented by a bit within the buffer. The buffer is divided into a plurality of square sections each storing a portion or subimage of the full image. Each section is n×n bits in size where n is the number of bits in a word stored in the buffer. The contents of each square section of the buffer can be transferred into an n×n storage array with first word organization, and then transferred back into the buffer with second word organization such that the subimage stored by the square section is rotated through 90°.

An object of the present invention is to provide an image rotation apparatus of the type incorporating an image buffer in which an image stored in the buffer can be rotated before it is stored in a bulk store for later retrieval or is displayed on the screen of a cathode ray tube.

THE DRAWINGS

In order that the invention may be readily carried into effect, embodiments thereof will now be described, by way of example, with reference to the accompanying drawings, in which.

PREFERRED EMBODIMENT OF THE INVENTION

Figure 1:
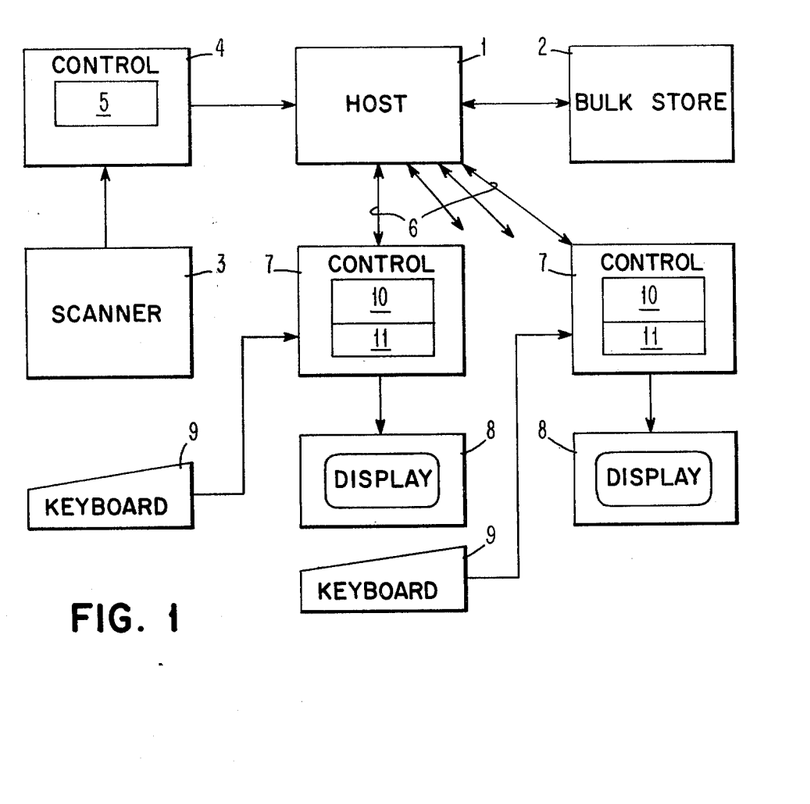
FIG. 1 is a block diagram showing a data processing system in which images can be scanned, stored and displayed.

Referring now to FIG. 1, a data processing system for scanning, storing and displaying images comprises a host processor 1, for example an IBM (Registered Trade Mark) System 370 computer, to which is attached a bulk store 2, for example an IBM 3850 storage system. Documents can be entered into the system by means of a scanner 3 and a control unit 4 containing a buffer 5 within which the scanned image can be stored before onward transmission to the host processor 1. The scanner 3 and its associated control unit 4 are conventional and may, for example, comprise a raster scanner and digitizer.

Scanned images are digitally stored within bulk store 2 for subsequent retrieval. Connected to the host processor 1 on lines 6 are terminals consisting of a control unit 7, a cathode ray tube display 8 and a keyboard 9. Each terminal control unit 7 contains an image store 10 whose purpose is to refresh the display 8 and rotation hardware 11 which will be described in more detail below.

If desired, the scanner operator could be provided with image rotation hardware in the control unit 4 to rotate a scanned image before it is stored in the bulk store 2. However this would not normally be required since the retrieval terminal would normally have their own rotation hardware to allow for rotation of images of documents which contain "horizontally" and "vertically" formatted information. If the operator wishes to rotate the viewed image, he or she may do so either by pressing a dedicated key on his or her keyboard 9 or by pressing a coded combination of keys.

Figure 2:
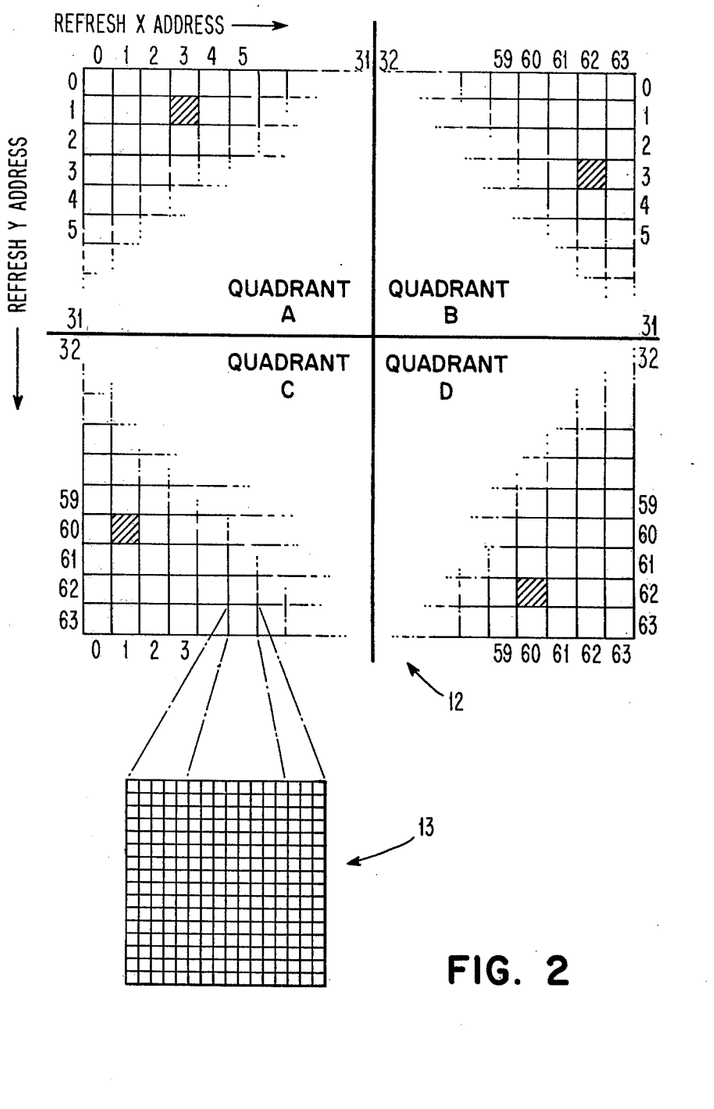
FIG. 2 is a schematic of a refresh buffer in which an image to be displayed on a cathode ray tube is stored.

FIG. 2 illustrates the layout of a word-organized random access memory 12 (corresponding to buffer 10, FIG. 1) which can be used to store an image for CRT refresh purposes. In the example shown, the memory is divided into 64×64 squares, each square 13 having a side length equal to the memory word length, in this case 16 bits×16 bits. Thus there are 64×64=4096 squares 13 in the complete image and the memory 12 contains 4096×16×16=1,048,606 bits. For simplicity, it is assumed that the image is black and white so that only one bit per picture element (pel) is required. In this case the memory could be used to display a square image of 1024 pels per TV scan line and 1024 active scan lines per frame. The TV monitor (CRT tube) may be interlaced or non-interlaced. (It will be realized that this is the maximum size of image which can be displayed: smaller images would occupy less space on the buffer).

If a color or other grey-scale image is to be displayed, more than 1 bit per pel would be required but the principles would be similar to those described below.

A first preferred embodiment of the invention will now be described with reference to FIGS. 2 and 3. The image rotation hardware of FIG. 3 employs a pair of shift register matrices 15 and 16. The image buffer 12 is divided into four quadrants each having 1024 different 16×16 squares 13 contained therein. By means of data paths 17 and 18, the contents of a square 13 can be read by word into one of the shift register matrices. The contents of the first shift register matrix 15 can be read bit by bit into the second shift register matrix 16 along data path 19, and the contents of the second shift register matrix 16 can be read bit by bit into a square 13 in a different quadrant in the image buffer 12.

Operation of the shift registers 15 and 16 to produce 90° rotation is performed in the following sequence:

1. Read contents of square in quadrant A into the second matrix 16 (for example square at address x=3, y=1).
2. Read contents of square in quadrant B into the first matrix 15 (in the example given, this square will be from address x=62, y=3).
3. Read contents of second matrix 16 into vacant square in quadrant B (at address x=62, y=3) while shifting contents of first matrix 15 into second matrix 16.
4. Read contents of square in quadrant D (at address x=60, y=62) into first matrix 15.
5. Read contents of second matrix 16 into square in quadrant D (at address x=60, y=62) while shifting contents of first matrix 15 into second matrix 16.
6. Read contents of square in quadrant C (at address x=1, y=60) into first matrix 15.
7. Read contents of second matrix 16 into square in quadrant C (at address x=1, y=60) while shifting the contents of first matrix 15 into second matrix 16.
8. Read contents of matrix 2 into square in quadrant A (at address x=3, y=1).

Each step in this sequence involves the whole contents of the given square and in the example shown requires 16 memory read and write cycles. The complete sequence will be repeated for each square in a quadrant: thus in the example shown, the above sequence will be repeated 16×32=512 times requiring a total of 512×16=8192 memory read cycles plus 4096 writes. During the rotation of the image, the CRT screen is preferably blanked to avoid visual disturbance of the operator.

To summarize the rotation operation, a vacant square in the image buffer is created by reading its contents temporarily into the first matrix 15. The contents of the second matrix 16 are read into the vacant square in the image buffer while the contents of the first matrix 15 are shifted into the second matrix 16 thus allowing another vacant square to be created in the image buffer by writing into the first matrix 15. While each square is written into the first shift matrix, its word direction is re-oriented to suit the rotated image and is then written back to memory in the new position required for the rotated image.

Figure 3:
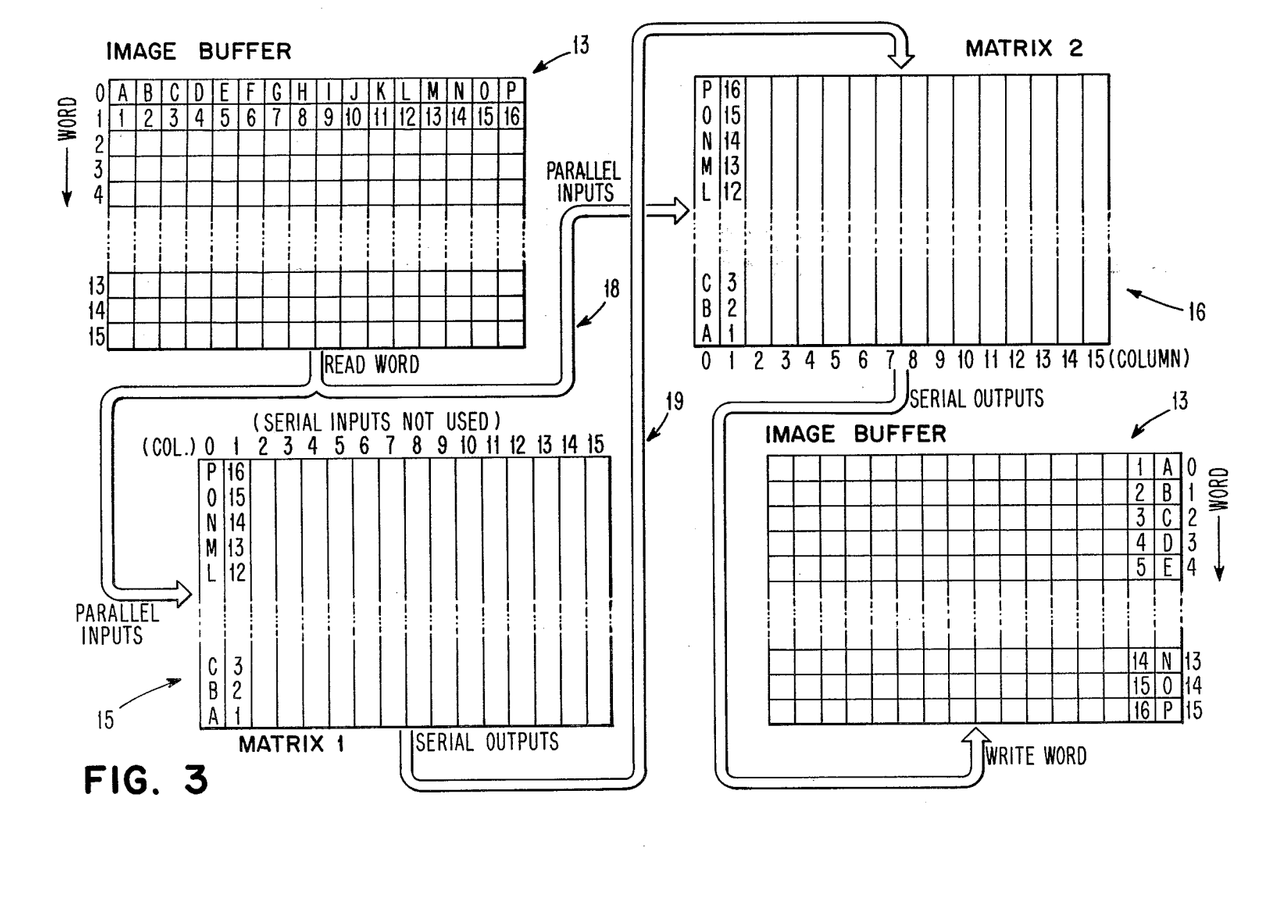
FIG. 3 shows the relationship between a quadrant of the refresh buffer and a pair of shift register matrices used for 90° rotation.
Figure 4:
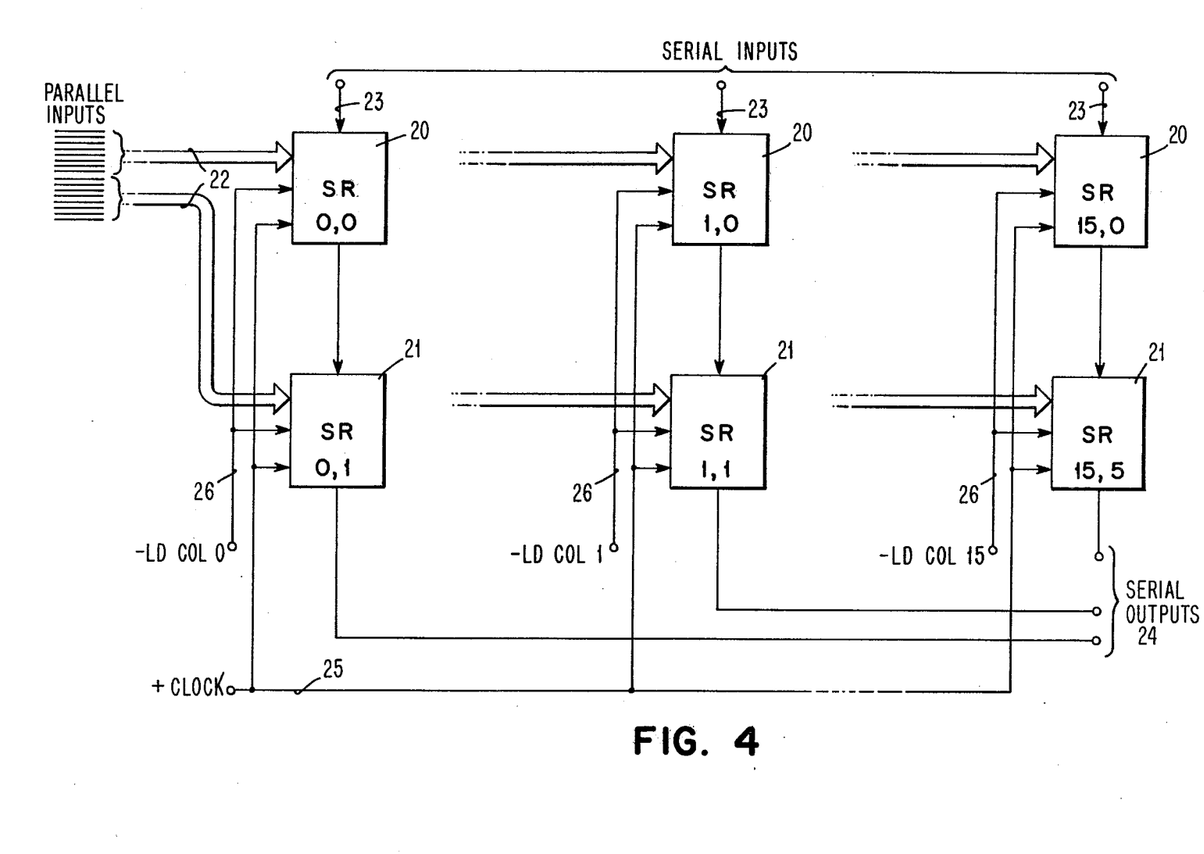
FIG. 4 shows how a shift register matrix can be formed from a plurality of logic modules.

FIG. 4 illustrates a possible construction of a shift register matrix. The matrix consists of a first bank of 8-bit shift registers 20 connected in parallel and a second bank of 8-bit shift registers 21 connected in parallel. Each register 20 is connected in series to the register 21 in its own column. The parallel inputs 22 are connected to receive 16-bit words read from the image buffer. For the first shift register matrix 15, FIG. 3, the serial inputs are grounded together since they are not used. The serial outputs 24 of the first matrix 15, FIG. 3, are connected to the serial inputs of the second matrix 16, FIG. 3, while those of the second matrix 15, FIG. 3, are connected to write 16-bit words back into the image buffer. Clock pulses are supplied to the shift registers on line 25. Lines 26 control parallel loading of the shift register columns. Typically, each shift register 20 or 21 may be constituted by an SN 74 165 shift register module.

Figure 5:
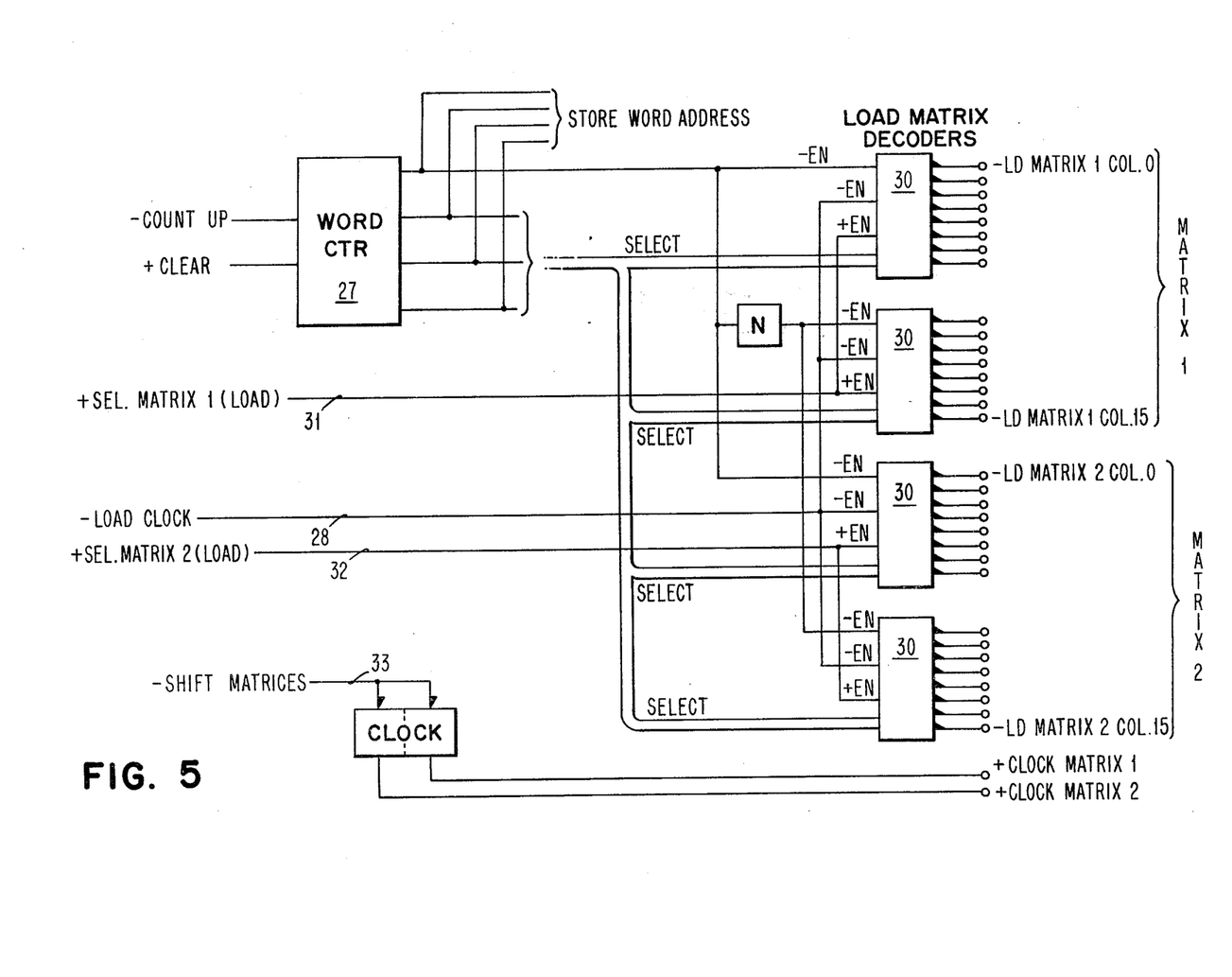
FIG. 5 illustrates control logic for the shift register matrices.
Figure 6:
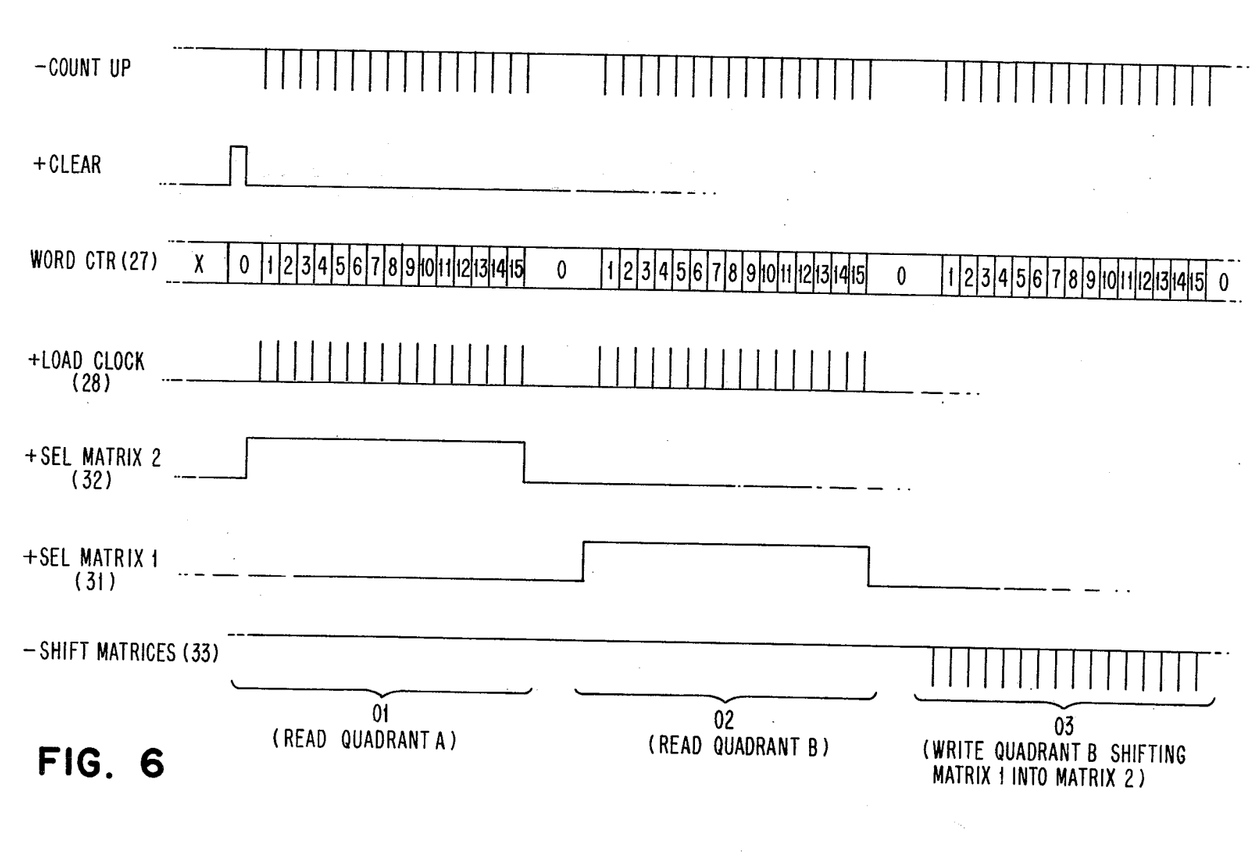
FIG. 6 is a timing diagram showing a sequence of operations to rotate an image within the refresh buffer.

FIG. 5 illustrates control logic for the first and second shift register matrices 15 and 16 and will be described with reference to FIG. 6 which is a timing diagram of the first three phases of the rotation sequence described above. The operation of the other phases will be apparent and will not be further described. Referring now to FIGS. 5 and 6, during the first phase, the sixteen words of the selected square within quadrant A are read from the store into the second matrix 16. With word counter 27 set at 0, the first word is read and loaded into column 0 of the second matrix with the first "load clock" pulse 29 on line 28. The pulse is directed to the two modules forming column 0 by means of the load matrix decoder constituted by the modules 30 which may conveniently be formed from four SN 74S 138 modules. The word counter 27 is advanced to 1 and the next word loaded into column 1 of the second matrix. This process continues until all 16 words have been loaded into the second matrix to complete phase 1 of the sequence.

During phase 2 of the sequence, a similar process occurs except that the quadrant selector (not shown) is set to quadrant B and the first matrix is selected instead of the second matrix.

During phase 3 of the sequence, re-oriented pels loaded into the second matrix during phase 1 are written into the square selected during phase 2 with the quadrant selector remaining set to quadrant B. The first word to be written, i.e., word 0, is a new word made up of the 16 first bits of the original 16 words loaded into the second matrix. The word appears at the matrix serial outputs without further control pulses to the second matrix. The word counter 27 is next advanced to 1 and both matrices receive a shift pulse by means of line 33. This causes another new word to appear on the serial outputs of the second matrix. This word consists of the second bits of the original 16 words loaded into the second matrix. At the same time, the word appearing at the serial outputs of the first matrix is shifted into the second matrix via its serial inputs and another new word appears at the serial outputs of the first matrix. The word appearing at the serial outputs of the second matrix is written into word 1 of the image buffer and another shift pulse is given to both matrices. A third new word appears on the serial outputs of the second matrix while another word is shifted from the first matrix into the second matrix. The word counter 27 is advanced to 2 and a write occurs into word 2 from the second matrix. The process continues until all 16 locations in the image buffer are written into from the second matrix and all the data from the first matrix has replaced the original data in the second matrix.

By referring to FIG. 3, it will be appreciated that the data in the write storage area has been rotated 90° clockwise with respect to that in the read area. The remaining 5 phases of the 8-phase sequence of the rotate cycle are performed in a similar manner.

Figure 7:
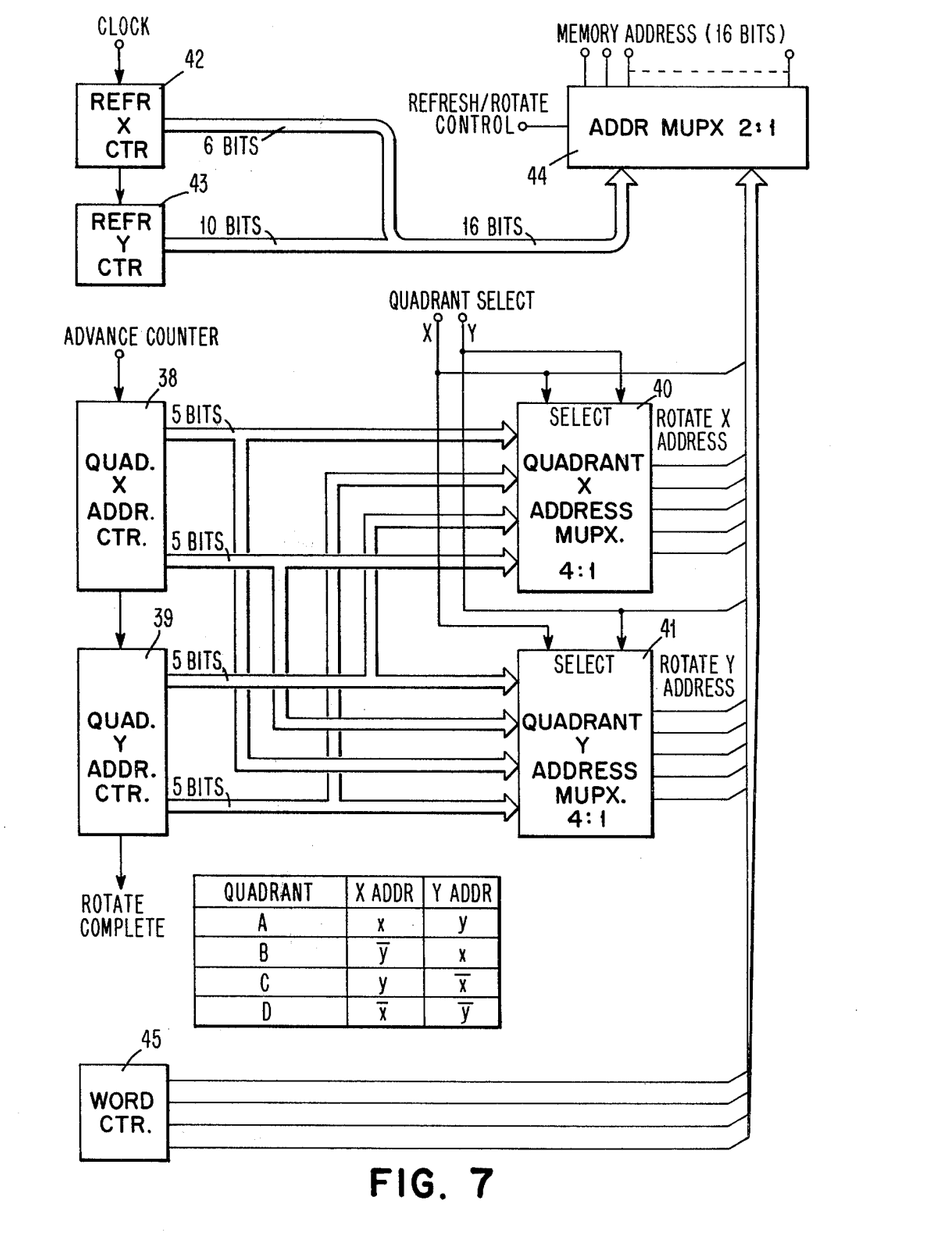
FIG. 7 is a block diagram of addressing logic for the refresh buffer.

As stated above, the rotation process is started at the first square in quadrant A and is completed when all squares in quadrant A have been processed. FIG. 7 shows logic for generating the addresses of the corresponding squares in the other quadrants. The logic comprises X and Y quadrant address counters 38 and 39 respectively whose true and inverted outputs are connected as shown to X and Y quadrant address multiplexers 40 and 41 respectively. X and Y refresh counters 42 and 43 have their outputs connected to 2:1 address multiplexer 44 whose other inputs are the rotate X-address from 4:1 multiplexer 40 and rotate Y-address from 4:1 multiplexer 41 and the output of word counter 45. The output of multiplexer 44 constitutes the address in the image buffer which is to be read or written into. Table 46 in FIG. 7 shows the relationship between the X and Y addresses. Thus in the example described above with respect to FIGS. 2 and 3, the address of the square of interest in Quadrant A was x=3, y=1. The corresponding address in Quadrant B is $X=\bar{y}=63-y=62$, $Y=x=3$. The corresponding address in Quadrant C is $X=y=1$, $Y=\bar{x}=63-x=60$, and the corresponding address in Quadrant D is $X=\bar{x}=60$, $Y=\bar{y}=62$.

The operation of the logic shown in FIG. 7 is as follows.

Assume that the terminal is to display an image stored in the image buffer. In this event the first "n" pels to be displayed on the top line are addressed by counters 42 and 43 which are reset to 0 at this time. This address will be passed to the buffer by multiplexer 44. The next clock pulse will advance the refresh X, Y address in counters 42 and 43 to X=1, Y=0, and the new buffer address will appear at the output of multiplexer 44. This process will continue until all bit positions in the buffer have been addressed. Each time the refresh X counter 42 reaches its maximum value, it is reset to 0 and the refresh Y counter 43 is incremented by 1.

During the image rotation process, the multiplexer 44 is arranged to transmit rotate X and Y addresses from the multiplexers 40 and 41. The signals appearing on the quadrant select lines (X) and (Y) represent the most significant bits of the X and Y addresses. As well as controlling the multiplexers 40 and 41, these most significant bits also constitute part of the rotate X and Y addresses. The values of these most significant bits during addressing of the quadrants are as follows:

| quadrant A | 0 | 0 |
| quadrant B | 1 | 0 |
| quadrant C | 0 | 1 |
| quadrant D | 1 | 1 |

At the beginning of the rotation process both counters 38 and 39 will contain the value 0. With quadrant select at 0, 0 this will cause the buffer to address the first square section in the buffer and the contents are read into the shift register matrix. With quadrant select at 1, 0, the corresponding square in quadrant B of the buffer will be addressed and its contents will be read into the other shift register matrix. With quadrant select still at 1, 0, the reoriented bit pattern originating from quadrant A will be read back into the image buffer into the corresponding square of quadrant B. The next quadrant select signal will be 1, 1 to address quadrant D of the buffer to allow read out of the corresponding square and writing of the reoriented bit pattern into the buffer. The process continues for quadrant C (with quadrant select at 0, 1) until finally quadrant A is again addressed. The process will be repeated for each square in quadrant A until all squares have been reoriented. The contents of word counter 45 are used to address each word inside a square. To step from one square in quadrant A to the next, counter 38 is incremented by 1. When counter 38 reaches its maximum value (X=31 in the example shown) it is reset and the count in counter 39 is incremented by 1. When the count in counter 39 reaches its maximum value (Y=31 in the example shown) it indicates that the rotation process is complete. The addressing logic can then revert to refresh mode, i.e., the refresh counters 42 and 43 are used for addressing.

Since refresh and rotation do not occur at the same time, in a modification, not shown, the refresh and quadrant address registers could be combined.

In the embodiment described above, use has been made of a square image buffer to refresh the screen. It will be evident that a non-square imge will not fill the buffer completely but it is also true that if a non-square image can be stored in one orientation, it can also be stored oriented at 90°.

Figure 8:
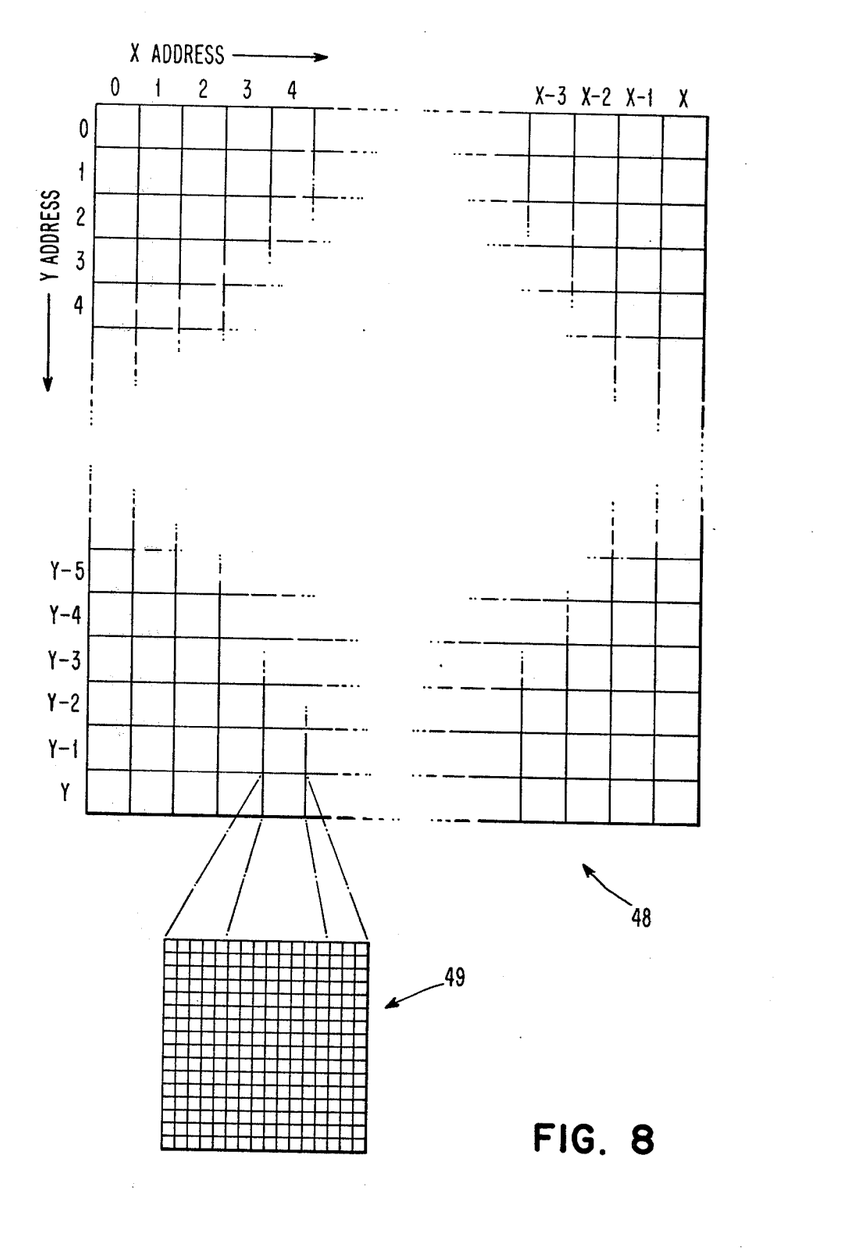
FIG. 8 is a schematic of a rectangular refresh buffer.

This is not necessarily true when the image buffer is non-square. FIG. 8 shows a word-organized image buffer 48 which is non-square, i.e., $X_{max} \neq Y_{max}$. In contrast with the first embodiment described above, the buffer 48 is not divided into four quadrants. However, in common with the first embodiment, the buffer 48 is divided into a number of squares, each square having a side-length equal to the number of bits in a word. Shown in this example is a square 49 of size 16×16 bits: larger or smaller word sizes could be used with resulting larger or smaller memory squares.

For CRT refresh purposes, each square is addressed by X and Y counters, not shown, via address optimizing logic, not shown, which enables the non-square image to be mapped without waste of space into the binary memory. During the rotation operation each square is read in turn into a shift register matrix of the types described with reference to FIG. 4. However, in contrast with the embodiment described above, only one shift register matrix is required and the rotated bits are read back into the same square in the image buffer 48. Thus the word orientation is changed to suit the rotated image. When every square has had its contents read, rotated and rewritten, the image buffer can be used to refresh the CRT screen but with the X and Y address counters modified to suit the rotated image. Thus before rotation, the X counter was incremented at the pel rate divided by n, the number of bits in a word, and the Y counter was incremented at the TV line rate divided by n.

If rotation is 90° clockwise, then the X and Y counters are changed as follows. The X counter is incremented at the TV line rate divided by n and the Y counter is decremented at the pel rate divided by n. If rotation is 90° anti-clockwise, the X counter is decremented by the TV line rate divided by n and the Y counter is incremented at the pel rate divided by n. An independent square word counter is incremented at the TV line rate to indicate which word within the square is to be addressed on each TV line. This square word counter is reset after n TV lines.

No detailed description of the address logic is given since it is believed that this will be readily apparent to those skilled in the art.

Where the word length used for refresh is large to enable high refresh data rates, and the minimum word length for write is much less than the refresh word length, it may be desirable to use a rotation technique which is essentially a combination of the two methods so far described. In this event the method used is the same as the second embodiment, that is squares are read, rotated and rewritten into the same square except that each square is regarded as a sub-image: each sub-image is rotated as described in the first embodiment, that is the squares are each divided into quadrants and a pair of shift register matrices are used to rotate sub-squares within the sub-image. Such a technique can also be used if it is desired to rotate only part of an image.

All of the three methods described above, allow 90° rotation. To obtain 180° rotation, the 90° operation can be repeated. During the rotation operation, it is preferred that the CRT screen is blanked to prevent visual disturbance to the operator. It is not essential for the whole image stored in the image buffer to be displayed on the screen simultaneously. Those skilled in the art will appreciate that scrolling methods, known per se can be used to enable a document in horizontal format to be viewed on a vertically-oriented rectangular CRT and vice versa.

Figure 9:
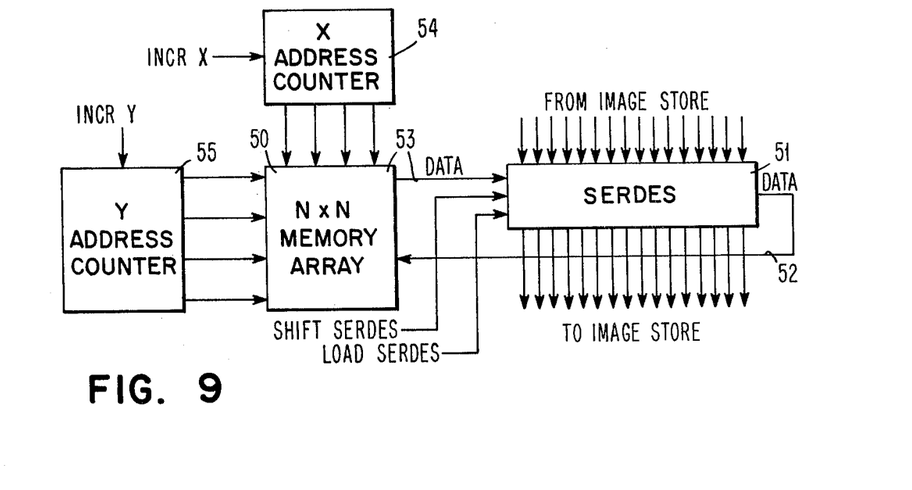
FIG. 9 shows a monolithic memory arrangement which can be used instead of the shift register matrices to provide for rotation.

For larger shift register matrices, either single or double, a more economical approach may be to use a monolithic memory 50 organized as N×N words of bit. As each word (N bits) is read from the image buffer, it is loaded in parallel into a serializer/deserializer 51 and then is written bit by bit along line 52 into the memory array 50. Suitably the serializing portion of the serializer/deserializer 51 may comprise a pair of parallel load, serial output shift registers type SN 74195. The reoriented data in memory 50 is read from the memory, bit by bit along line 53 into a serializing section of serializer/deserializer 51. This serializing section can consist, for example, of a pair of shift registers type SN 74195. Sixteen-bit reoriented words are written back into the image buffer from the serializer/deserializer 51.

An X address counter 54 and a Y address counter 55 are used to address the monolithic memory. In the case of a 16×16 matrix using, for example, an SN 74 S200 memory (256 words by 1 bit), each of the X and Y counters may be comprised of a 4-bit counter, type SN 74 193. While loading the memory 50, the X counter 54 is incremented for each bit written and the Y counter 55 is incremented for each bit read.

To perform rotation as in the first or third embodiments in which two shift register matrices are required, the number of bits in the memory 50 is doubled and the most significant address bit is used to switch between the two halves of the memory.

Although the use of a monolithic memory instead of a shift register matrix may be more economical, the rotation operation will generally take longer due to each bit being handled serially. However, the memory 51 would normally have a shorter cycle time than the image buffer which would reduce the impact of handling the bits serially.

Figure 10:
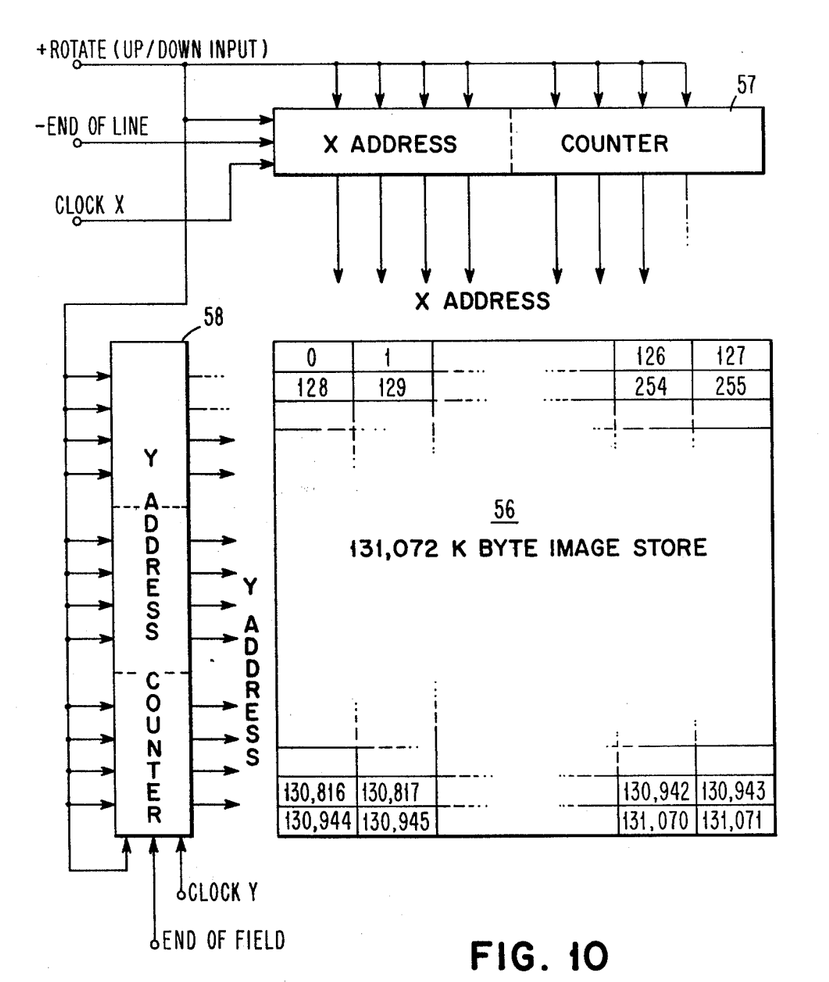
FIG. 10 illustrates how an image store may be addressed to provide 180° rotation.
Figure 11:
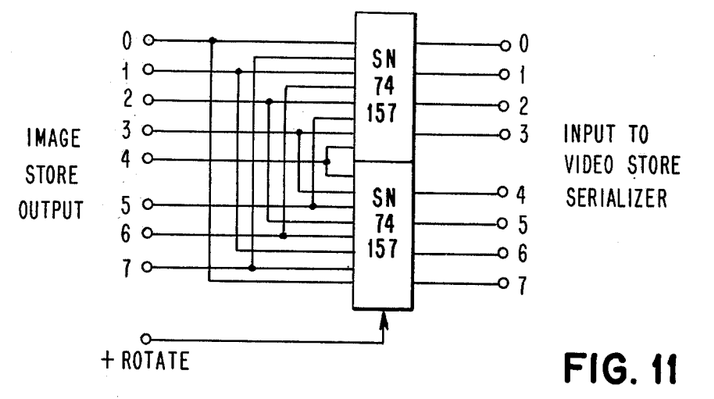
FIG. 11 illustrates a bit rotation circuit for use with the arrangement of FIG. 10.
Figure 12:
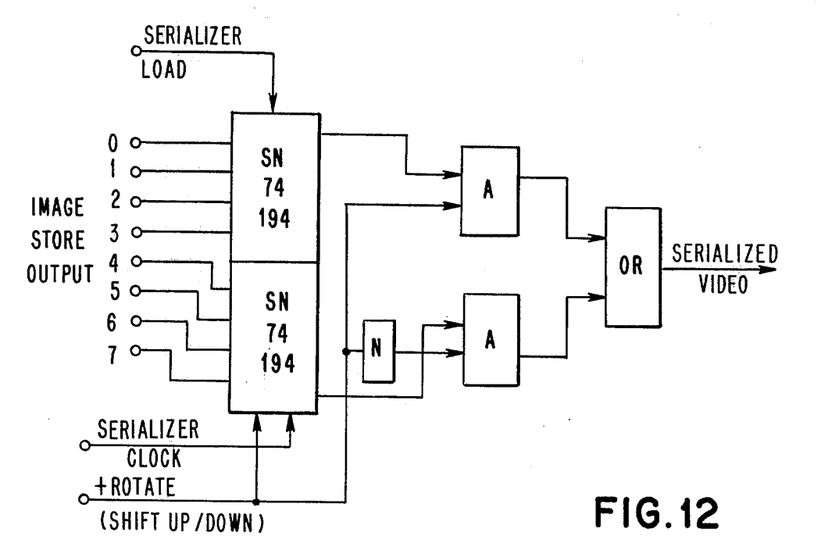
FIG. 12 illustrates a bidirectional serializer which can be used instead of the circuit of FIG. 11.

As described above, 180° rotation can be accomplished by two 90° rotation making use of the rotation hardware described to reorient the bit pattern within the buffer store. In some circumstances, it may be desirable to be able to rotate an image within the buffer without reorienting the bit pattern within the image buffer. FIGS. 10 to 12 illustrate an optional feature of the invention which allows such 180° rotation. This is accomplished by modifying the image buffer addressing during refresh and reversing the order of bits within the word at the image buffer output.

To illustrate this principle, FIG. 10 shows a 1024×1024 bit image buffer 56 in which the image is stored as 131,072 words of 3 bits. It will be appreciated, however, that other word sizes could be used. The image store address consists of a 7-bit X address field and a 10-bit Y address field. These address fields are driven from 7-bit and 10-bit up/down counters 57 and 58 respectively which, for example, consist of up/down counter modules such as SN 74 190. Normally, both counters 57 and 58 operate in count up mode with the first word on the first line (word 0) being accessed first followed by the rest of the words on the first line up to the last word on the first line (word 127). During this period the X counter 57 is incremented from 0 to 127 with the Y counter 58 at 0. The process is repeated during the second line with the Y counter set at 1, thus accessing words 128 to 255. The process is continued until word 131,071 has been accessed (Y counter=1023 and X counter=127). Both counters are reset at this time and at the beginning of the next TV field, the whole process is repeated.

To rotate the viewed image by 180°, the addressing is modified by causing the counters 57 and 58 to count down and presetting them to their maximum values instead of to zero. The effect of this is that at the beginning of the first TV line with the X counter 57 set to value 127 and the Y counter 58 set to value 1023, word 131,071 is accessed. The X counter 57 is decremented to value 126 to access word 131,070: when value 0 is reached, the word 130,944 is accessed. During the second TV line, the X counter 57 is reset to value 127 and the Y counter 58 is decremented to the value 1022. The process is repeated to the end of the last TV line when both counters 57 and 58 will contain zero. The X counter 57 will next be preset to value 127 and the Y counter 58 to value 1023 to await the beginning of the next TV field.

Thus, the order of accessing words is exactly reversed when 180° rotation is being performed. To complete the rotation operation, the order of the bits in each word appearing at the image buffer output must be reversed. This may be achieved by using two SN 74 157 data selector modules as shown in FIG. 11.

Alternatively a bidirectional serializer at the final video output would serve the same function of reversing the bit order within the words: typical modules for such application would be two SN 74 194 modules connected as shown in FIG. 12.

What has been described is hardware for rotating an image in a word-organized image buffer through 90°. Use is made of one or two shift register matrices or monolithic memories to reorient the bit pattern within squares in the buffer which have a side equal in length to the number of bits in a word. Such rotation hardware would normally be used in conjunction with a cathode ray tube display where the image buffer is used to refresh the display. Optionally the rotation hardware could be used in conjunction with an image buffer associated with a scanner to allow rotation of a scanned image before storing in a bulk store for subsequent retrieval or before onward transmission.

Having thus described my invention, what I claim as new, and desire to secure by Letters Patent is:

1. Image rotation apparatus comprising a word-organized image buffer means for storing a digital representation of an image with each pel of the image being represented by a bit within the buffer, said buffer being a square divided into four quadrants each quadrant containing a plurality of square sections each square section representing a sub-image and having a size of $n \times n$ bits where n is the number of bits in a word, a pair of $n \times n$ storage arrays, means for writing the contents of each square section in one quadrant of said buffer means into one of said storage arrays with a first word organization means for writing the contents of the corresponding square section of the adjacent quadrant into the other of said storage arrays to create a vacant square section in said adjacent quadrant, and means for writing the contents of said first storage array back into said buffer means in said corresponding square section with a second word organization such that the sub-image represented by said bit pattern is rotated through 90°.

2. Apparatus as claimed in claim 1, including means for shifting the contents of one storage array of said pair into the other storage array of said pair as the contents of the latter are written back into said buffer means.

3. Image rotation apparatus comprising a word-organized image buffer means for storing a digital representation of an image with each pel of the image being represented by a bit within the buffer, said buffer being divided into a plurality of square section each representing a sub-image and having a size of $n \times n$ bits where n is the number of bits in a word, said square section each being divided into a quadrant each quadrant containing a plurality of square subsections, a pair of storage arrays, each equal in size to a square subsection, means for writing the contents of each square subsection of said buffer means into one of said storage arrays with a first word organization means for writing the contents of the corresponding square subsection of the adjacent quadrant in the same square section into the other of said storage arrays to thereby create a vacant subsection in said adjacent quadrant, means for writing the contents of said storage array back into said buffer means in said vacant subsection of said adjacent quadrant with a second word organization such that the sub-image represented by said bit pattern is rotated through 90°, and means for reorienting the addresses of said buffer means after said reoriented bits have been stored therein.

4. Apparatus as claimed in claim 3 in which each storage array is a monolithic memory, said apparatus further comprising a serializer for receiving bits in parallel from said monolithic memory, and a deserializer for receiving bits serially from said monolithic memory and for transmitting said serially received bits in parallel to said buffer.

5. Apparatus as claimed in claim 4 which the or each storage array is a shift register matrix.

6. Apparatus as claimed in claim 5, further comprising a cathode ray tube display, said image buffer being arranged to refresh said display.

7. Apparatus as claimed in claim 6, further comprising means selectable to read words from said buffer in reverse order and means selectable to reverse the order of bits in each word read from said buffer during refresh, whereby the displayed image is oriented at 180° from the image stored in the image buffer.

* * * * *